US012715467B2

(12) United States Patent
Best et al.

(10) Patent No.: US 12,715,467 B2
(45) Date of Patent: Aug. 25, 2026

(54) SYSTEMS AND METHODS FOR PERSONALIZED AUTONOMOUS DRIVING

(71) Applicants: TOYOTA RESEARCH INSTITUTE, INC., Los Altos, CA (US); GEORGIA TECH RESEARCH CORPORATION, Atlanta, GA (US)

(72) Inventors: Andrew P. Best, Sunnyvale, CA (US); Mariah L. Schrum, Atlanta, GA (US); Matthew C. Gombolay, Atlanta, GA (US)

(73) Assignees: TOYOTA RESEARCH INSTITUTE, INC., Los Altos, CA (US); GEORGIA TECH RESEARCH CORPORATION, Atlanta, GA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 18/484,022

(22) Filed: Oct. 10, 2023

(65) Prior Publication Data

US 2025/0115273 A1 Apr. 10, 2025

(51) Int. Cl.

*B60W 60/00* (2020.01)
*B60W 30/14* (2006.01)
*B60W 40/09* (2012.01)

(52) U.S. Cl.

CPC .......... *B60W 60/001* (2020.02); *B60W 30/14* (2013.01); *B60W 40/09* (2013.01); *B60W 2556/10* (2020.02)

(58) Field of Classification Search

CPC ..... B60W 2050/0075; B60W 2540/30; B60W 2556/10; B60W 30/14; B60W 40/09; B60W 60/001

See application file for complete search history.

(56) References Cited

U.S. PATENT DOCUMENTS

2021/0125076 A1* 4/2021 Zhang .................. G08G 1/0137
2021/0146785 A1* 5/2021 Wang ..................... G06N 20/00

(Continued)

FOREIGN PATENT DOCUMENTS

CN 108944930 A 12/2018

OTHER PUBLICATIONS

Comuni et al., "Passive and Active Learning of Driver Behavior from Electric Vehicles," 2022 IEEE 25th International Conference on Intelligent Transportation Systems (ITSC), pp. 929-936, arXiv:2203.02179v1, Mar. 4, 2022 https://doi.org/10.1109/ITSC55140.2022.9922012).

(Continued)

*Primary Examiner* — Jerrod Irvin Davis
(74) *Attorney, Agent, or Firm* — SHEPPARD, MULLIN, RICHTER & HAMPTON LLP; Daniel N. Yannuzzi

(57) ABSTRACT

Systems and methods are provided for personalizing autonomous driving. The system can receive historical data on a driver of the vehicle's performance and population data indicating a population driving style. Speed data can be recorded as the driver of the vehicle drives the vehicle during a trial period. The historical data, population data, and speed data can be input into a machine learning model to determine a style for the driver. The system can receive one or more parameters from the machine learning model indicating the style. These parameters can be applied to the vehicle's automated driving system.

20 Claims, 5 Drawing Sheets

(56) References Cited

U.S. PATENT DOCUMENTS

| | | | | |
|---|---|---|---|---|
| 2022/0194400 | A1* | 6/2022 | Gee | G06V 10/82 |
| 2022/0219695 | A1* | 7/2022 | Satti | B60W 40/09 |
| 2025/0206354 | A1* | 6/2025 | Weast | B60W 30/095 |

OTHER PUBLICATIONS

Basu et al., "Do You Want Your Autonomous Car to Drive Like You?" 2017 12th ACM/IEEE International Conference on Human-Robot Interaction (HRI), pp. 417-425, Mar. 9, 2017 (http://dx.doi.org/10.1145/2909824.3020250).

Houston et al., "The Aggressive Driving Behavior Scale: Developing a Self-Report Measure of Unsafe Driving Practices," North American Journal of Psychology, 5(2):193-202, Jan. 2003 (https://scholarship.rollins.edu/cgi/viewcontent.cgi?article=1339&context=as_facpub).

Cooper et al., "A Confirmatory Factor Analysis of the Mini-IPIP Five-Factor Model Personality Scale," Personality and Individual Differences, 48(5):688-691, Apr. 2010 (https://doi.org/10.1016/j.paid.2010.01.004).

Schrum et al., "MAVERIC: A Data-Driven Approach to Personalized Autonomous Driving," arXiv:2301.08595v2 [cs.RO], Feb. 27, 2023, 10 pages (https://doi.org/10.48550/arXiv.2301.08595).

* cited by examiner

200
PERSONALIZED DRIVING STYLE CIRCUIT 210
MEMORY 208
PROCESSOR 206
203
POWER SUPPLY 212
201
WIRELESS TRANSCEIVER CIRCUIT 202
WIRED I/O INTERFACE 204
214
VEHICLE SYSTEMS 158
ICE CONTROL CIRCUIT 276
SUSPENSION SYSTEM 280
TORQUE SPLITTER(S) 274
OTHER 282
GPS/VEH POS SYSTEM 272
COOLING SYSTEM 278
SENSORS 152
V. ACCEL. 212
V. SPEED 214
WHEEL SPIN 216
TPMS 220
ROLL/PITCH/YAW 222
CLEARANCE 224
L/R F/R SLIP RATIO 226
ENVIRONMENTAL 228
OTHER 232

SYSTEMS AND METHODS FOR PERSONALIZED AUTONOMOUS DRIVING

TECHNICAL FIELD

The present disclosure relates generally to autonomous vehicles (AV), and in particular, some implementations may relate to personalizing the AV based on a driver's preferences and characteristics.

DESCRIPTION OF RELATED ART

Advanced driver assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. AV systems may go further than ADAS by leaving responsibility of maneuvering and controlling an AV to the autonomous driving systems. For example, an AV system may comprise some package or combination of sensors to perceive a vehicle's surroundings, and advanced control systems that interpret the sensory information to identify appropriate navigation paths, obstacles, road signage, etc.

BRIEF SUMMARY OF THE DISCLOSURE

According to various embodiments of the disclosed technology, a vehicle control system can comprise a processor and a memory coupled to the processor to store instructions, which when executed by the processor, cause the processor to: receive historical data on a driver of the vehicle's performance; receive population data indicating a population driving style; record speed data as the driver of the vehicle drives the vehicle during a trial period; input the historical data, population data, and speed data into a machine learning model to determine a style for the driver; receive one or more parameters from the machine learning model indicating the style; and apply the one or more parameters to the vehicle's automated driving system.

In some embodiments, the one or more parameters comprise following distance, lane change factors, velocity, and level of aggression.

In some embodiments, the historical data comprises survey results obtained from driver input.

In some embodiments, the machine learning model comprises a neural network.

In some embodiments, the trial period comprises the driver's first fifteen minutes of driving.

In some embodiments, applying the one or more parameters comprises updating the vehicle's adaptive cruise controller.

In some embodiments, the machine learning model comprises a following distance predictor, a lane change predictor, a velocity predictor, and a style predictor.

In some embodiments, the style predictor provides a prediction of the driver's subjective aggressiveness.

According to various embodiments of the disclosed technology, a method can comprise receiving survey data from a driver indicating the driver's aggressiveness; receiving population data indicating a population driving style; recording speed data as the driver of the vehicle drives the vehicle during a trial period; inputting the survey data, population data, and speed data into a neural network to determine a style for the driver; receiving one or more parameters from the neural network indicating the style; and applying the one or more parameters to a vehicle of the driver's automated driving system.

In some embodiments, the one or more parameters comprise following distance, lane change factors, velocity, and level of aggression.

In some embodiments, the trial period comprises the driver's first fifteen minutes of driving.

In some embodiments, applying the one or more parameters comprises updating the vehicle's adaptive cruise controller.

In some embodiments, the neural network comprises a following distance predictor, a lane change predictor, a velocity predictor, and a style predictor.

In some embodiments, the style predictor provides a prediction of the driver's subjective aggressiveness.

In some embodiments, the prediction of the driver's subjective aggressiveness is based on the survey data.

According to various embodiments of the disclosed technology, a non-transitory machine-readable medium can have instructions stored therein, which when executed by a processor, cause the processor to receive historical data on a driver of a vehicle's performance; receive population data indicating a population driving style; record speed data as the driver of the vehicle drives the vehicle during a trial period; input the historical data, population data, and speed data into a machine learning model to determine a style for the driver; receive one or more parameters from the machine learning model indicating the style; and update the vehicle's adaptive cruise controller based on the one or more parameters.

In some embodiments, the one or more parameters comprise following distance, lane change factors, velocity, and level of aggression.

In some embodiments, the historical data comprises survey results obtained from driver input.

In some embodiments, the machine learning model comprises a following distance predictor, a lane change predictor, a velocity predictor, and a style predictor.

In some embodiments, the style predictor provides a prediction of the driver's subjective aggressiveness.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
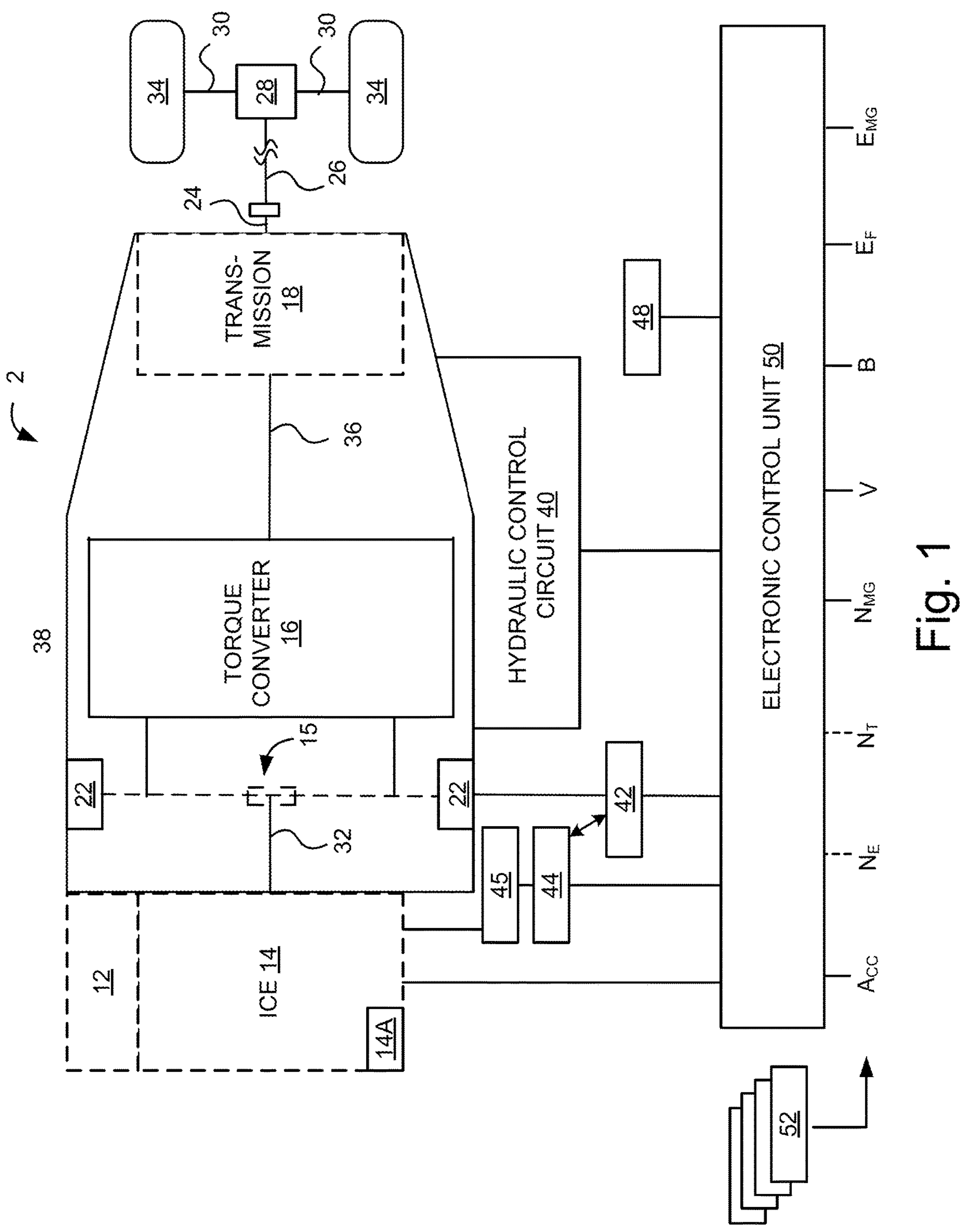
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Traditional AV systems, specifically highway AV driving assistance systems can automate driving situations without driver input, such as following distances, lane-change decisions, and speed choices in light of the posted speed. However, these systems maintain limited control over the AV's decision-making and do not take into account situations and considerations that a human driver would perceive. For example, an AV may maintain an objectively acceptable following distance, but the driver may prefer a closer following distance to replicate the driving standard for the geographic area. As another example, an AV may drive at a speed lower than the speed limit in view of the weather conditions, but the driver may be comfortable driving at or above the speed limit. This disconnect can quickly frustrate a driver who may in turn prefer to drive manually without use of the AV system.

There is plenty of driver data available for an AV system to personalize its driving style. The AV system can store historical data on a driver's past performance. Statistics can include driving speeds, braking speeds, following distances, lane change distances and timing, or any other data collected from the vehicle's plurality of sensors. The AV system can also collect this data as the driver uses the vehicle in real time to get present data. Further data can include surveys from the driver indicating their driving style and preferences in certain driving situations. The AV system can also receive population data that reflects a region's driving characteristics. This data can include average speeds, average following distances, relative speed to the speed limit, or other traffic characteristics in a given region. The AV system can also perceive local conditions based on the characteristics of a leading vehicle and other geographic or traffic conditions.

The systems and methods disclosed herein may be configured to consider any or all of the above forms of data to personalize an AV system based on the driver's driving style. This data can be input into a neural network that can determine parameters indicating the driving style. The data can be parsed to determine a driving style for a particular driver, for a geographic region, for a vehicle type, or for other classification. Parameters can include features such as, for example, following distance, braking speed, lane change times, lane changed distances, average speed, speed above or below the speed limit, or any other characteristics that impact a vehicle's driving behavior. The system can further train the neural network based on additional data, or can update parameters based on new data. For example, the neural network can take into account the first fifteen minutes of driving each day as an indicator of the driving style for the day. The system can apply various predictors to create a personalized embedding space that can push an AV system to be more or less "aggressive" based on the driver's preferences.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for personalizing an AV's driving style can be implemented in other types of vehicle including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, NE, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
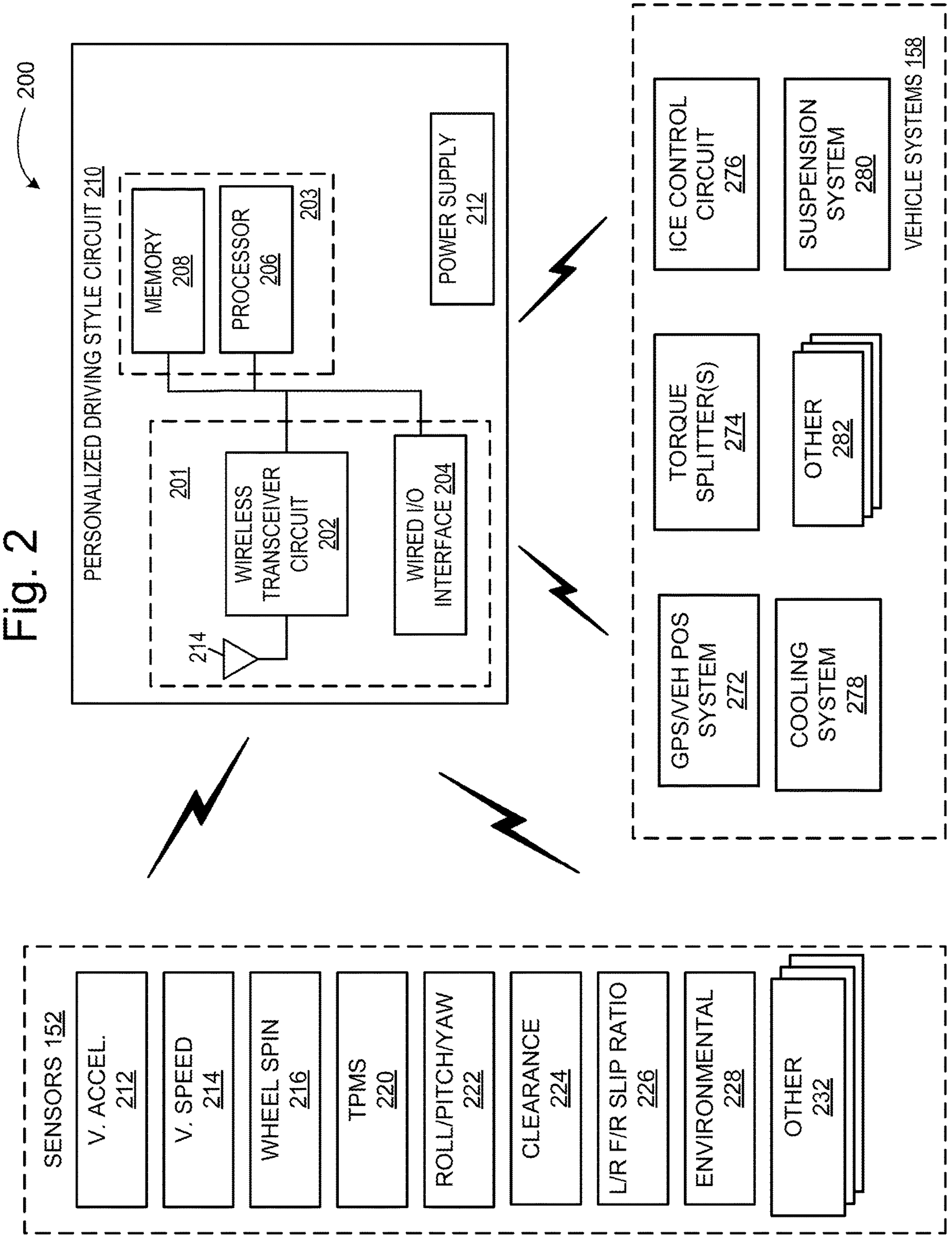
FIG. 2 illustrates an example architecture for personalizing an AV system in accordance with one embodiment of the systems and methods described herein.

FIG. 2 illustrates an example architecture for personalizing an AV's driving style in accordance with one embodiment of the systems and methods described herein. Referring now to FIG. 2, in this example, AV driving style system 200 includes a personalized driving style circuit 210, a plurality of sensors 152 and a plurality of vehicle systems 158. Sensors 152 and vehicle systems 158 can communicate with personalized driving style circuit 210 via a wired or wireless communication interface. Although sensors 152 and vehicle systems 158 are depicted as communicating with personalized driving style circuit 210, they can also communicate with each other as well as with other vehicle systems. personalized driving style circuit 210 can be implemented as an ECU or as part of an ECU such as, for example electronic control unit 50. In other embodiments, personalized driving style circuit 210 can be implemented independently of the ECU.

Personalized driving style circuit 210 in this example includes a communication circuit 201, a decision circuit 203 (including a processor 206 and memory 208 in this example) and a power supply 212. Components of personalized driving style circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to operate personalized driving style circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up personalized driving style circuit 210.

Communication circuit 201 either or both a wireless transceiver circuit 202 with an associated antenna 205 and a wired I/O interface 204 with an associated hardwired data port (not illustrated). As this example illustrates, communications with personalized driving style circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by personalized driving style circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 10 with which AV driving style system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of AV driving style system.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

During operation, personalized driving style circuit 210 can receive information from various vehicle sensors to determine the AV's driving style. Communication circuit 201 can be used to transmit and receive information between personalized driving style circuit 210 and sensors 152, and personalized driving style circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining the AV driving style. Additionally, communication circuit 201 can be used to send an activation signal or other activation information to various vehicle systems 158 as part of the determined driving style. For example, as described in more detail below, communication circuit 201 can be used to send signals to one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 3:
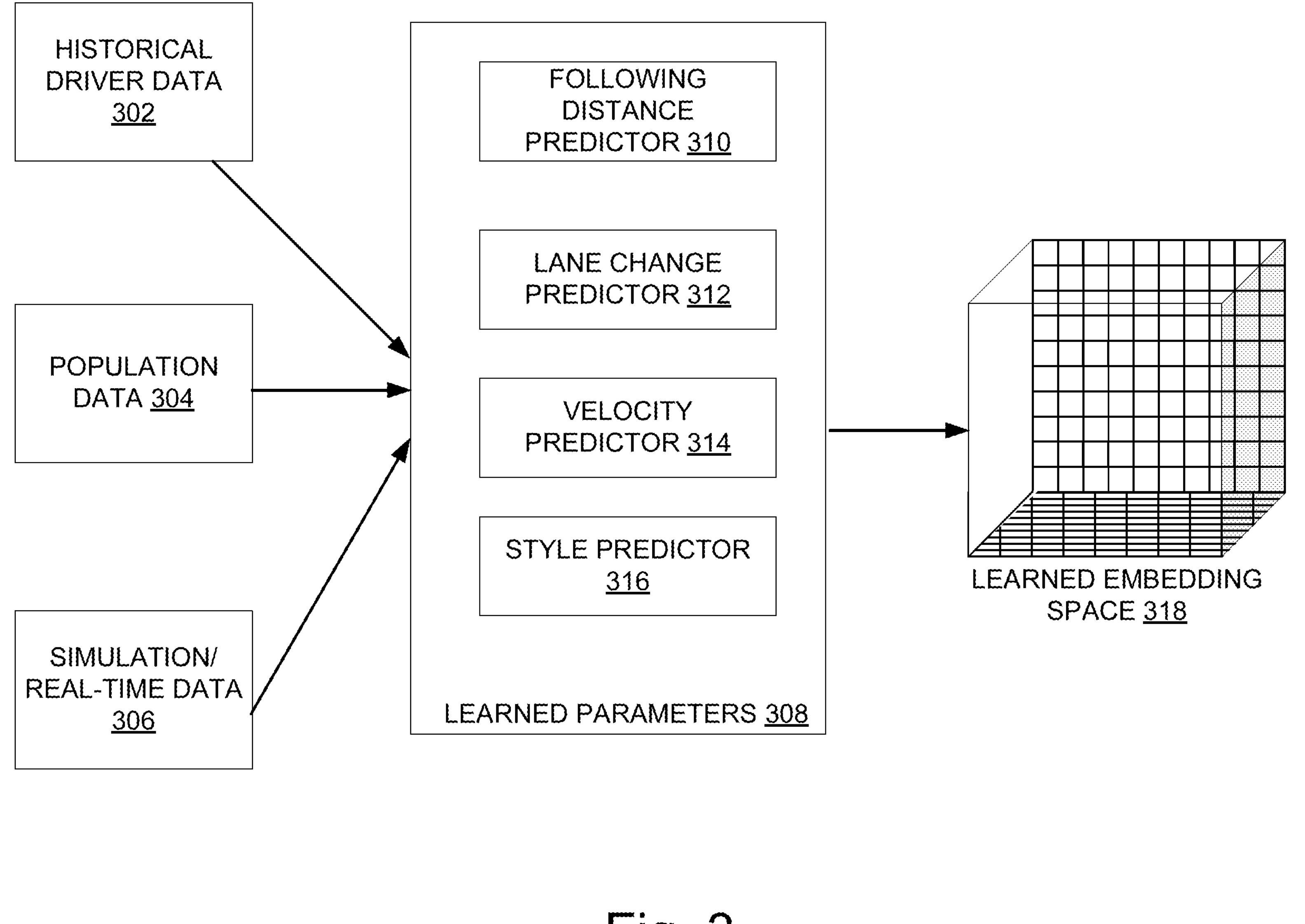
FIG. 3 illustrates an example system implementing the methods described herein.

FIG. 3 illustrates an example system for personalizing an AV system. As described above, the system can receive various forms of data. Historical data 302 can reflect a driver's past performance. Statistics can include driving speeds, braking speeds, following distances, lane change distances and timing, or any other data collected from the vehicle's plurality of sensors. Furthermore, drivers can complete a survey to indicate the driver's relative aggressiveness or other driving styles. Questions on the survey can be tailored to different categories of driving experiences. For example, a question may ask whether the driver is more aggressive in completing lane changes. Aggressiveness in this instance can refer to, for example, the distance between cars needed to complete a lane change, the time taken to complete a lane change, or speed over/at a speed limit.

Population data 304 can comprise information on a region's driving characteristics. This data can include information such as, for example, average speeds, average following distances, speed relative to the speed limit, or other traffic or driving characteristics. Population data 304 can be received from various sources such as municipal reports, navigation systems, or traffic updates. The AV system can also perceive local conditions based on the characteristics of a leading vehicle and other geographic or traffic conditions. For example, a leading vehicle may operate at a particular average speed for the particular weather condition. The system can note that average speed as an indicator for the geographic region. Geographic data may change as the leading vehicle updates. Alternatively, the system can take information from past leading vehicles to generate standard characteristics for the region.

Simulation real-time data 306 can comprise real-time recording of a driver's driving characteristics. Data can be generated during a driver's first drive or a set amount of time at the beginning of a trip. For example, the system may take the first ten to fifteen minutes of a driver's trip as the simulation data. The system can monitor characteristics such as the vehicle's following distance (based on sensors to identify a leading vehicle), the level of aggression for lane changes (based on vehicle sensors monitoring surrounding vehicles or objects), or the speed of the vehicle over time at particular intervals. This data can be taken from the driver's very first trip in the vehicle, or may be updated each time the driver operates the vehicle.

This data can be input into a neural network that can determine learned parameters indicating the driving style. Parameters can include, for example, following distances, braking speeds, lane change times, lane changed distances, average speeds, speeds above or below the speed limit, or any other characteristics that impact or shed light on a vehicle's driving behavior. In the example of FIG. 3, learned parameters 308 can be generated by following distance predictor 310, lane change predictor 312, velocity predictor 314, and style predictor 316. Predictors 310-314 can use a Long-Short Term Memory (LSTM) network to predict the probability of a lane change occurring and the desired velocity of the vehicle. Predictors 310-314 may share a subnetwork that uses data 302-306 to generate predictions for the vehicle. This subnetwork may focus on the velocity of the vehicle, velocity of a leading vehicle, and the distance between vehicles. Style predictor 316 may involve a separate subnetwork that can focus on the relative subjective aggressiveness of the driver. Style predictor 316 may place an emphasis on certain data such as the simulation or survey data in predicting a relative level of aggression. Style predictor 316 may contain a sub-network to ensure maximization of mutual information between one or more of the various sub-networks. Each sub-network may take as input aspects of a style-predictor network to further enable personalization.

Predictors 310-316 may be used to generate a learned embedding space 318 divided into different regions indicating various levels of aggressiveness. The size of points in the learned embedding space can indicate the level of aggression. It should be noted that predictors 310-316 can be replaced with one or more different predictors to generate different learned embedding spaces. In some embodiments, the neural network is focused on aspects of highway driving such as target speed, following distance, and whether to initiate a lane change. Indicating whether to initiate a lane change can comprise receiving binary inputs. The network can tune style parameters while keeping other parameters constant to shift the learned embedding space as necessary. The learned embedding space can also be focused on specific types of data. For example, a learned embedding space can be generated using only survey data. Once the learned embedding space 318 is generated, unique embedding vectors can be generated for individual drivers or vehicles. Personalization of these unique embedding vectors can shift along a gradient of aggression during training. Specific driver data may be added to the trained neural network to create the unique embedding vector. The unique embedding vector can be based on the learned embedding space. This learned embedding space can be fluid and change while maintaining a particular driving style. The unique embedding vector and/or predictors 310-316 can update a vehicle's adaptive cruise controller (ACC) to implement aggression-specific features to the AV system.

Figure 4:
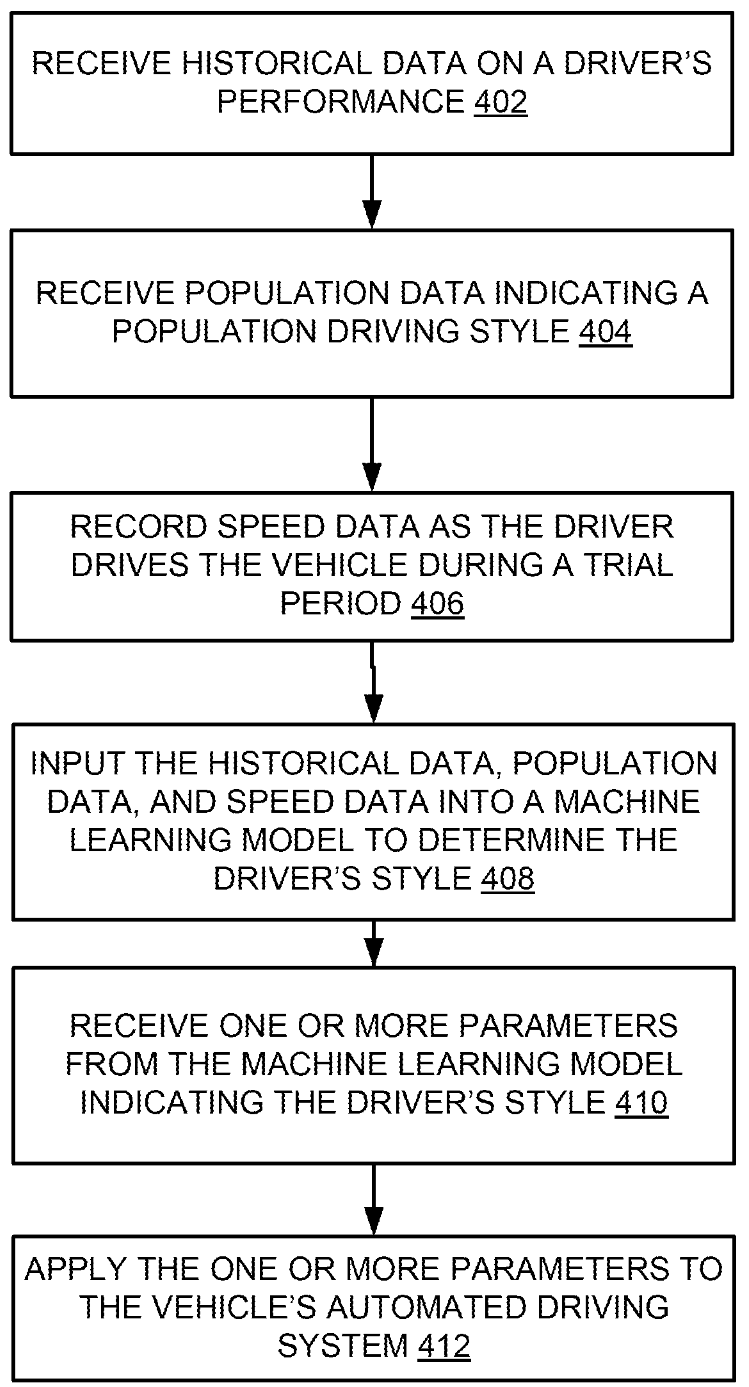
FIG. 4 illustrates an example method for determining a driver's style.

FIG. 4 illustrates an example method in accordance with the systems described above. At block 402, the system can receive historical data on a driver's performance. As described above, statistics can include driving speeds, braking speeds, following distances, lane change distances and timing, or any other data collected from the vehicle's plurality of sensors. Historical data can also comprise a self-reported survey indicating the driver's relative aggressiveness. Questions on the survey can be tailored to different categories of driving experiences.

At block 404, the system can receive population data. Population data can be based on a geographic region, type of road, type of terrain, vehicle class, vehicle make/model, or other factors affecting traffic for a population. As described above, population data can comprise, for example, average speeds, average following distances, relative speed to the speed limit, or other traffic characteristics. The AV system can also perceive local conditions based on the characteristics of a leading vehicle in real time and other geographic or traffic conditions. Alternatively, the system can take information from past leading vehicles to generate standard characteristics for the region.

At block 406, the system can receive speed data as a driver drives during a trial period. Data can be generated during a driver's first drive or a set amount of time at the beginning of a trip. The system can monitor characteristics such as the vehicle's following distance, the level of aggression for lane changes, or the speed of the vehicle over time at particular intervals. This data may be updated each time the driver operates the vehicle.

At block 408, the system can input the data in blocks 402-406 into a machine learning model to determine the driver's style. As described above, the machine learning model can comprise a neural network that can determine learned parameters indicating the driving style. The machine learning model may comprise one or more predictors that calculate the probability of various events indicating the driver's aggression. These predictors may generate the parameters that can be used to update the vehicle's AV system.

At block 410, the system can receive one or more parameters from the machine learning model. As described above, parameters can include, for example, following distance, braking speed, lane change times, lane changed distances, average speed, speed above or below the speed limit, or any other characteristics that impact a vehicle's driving behavior. Parameters may place an emphasis on certain data such as the simulation or survey data in predicting a relative level of aggression. At block 412, the parameters can be applied to the vehicle's driving system. In some embodiments, the parameters can update the vehicle's ACC to implement behavioral changes.

Figure 5:
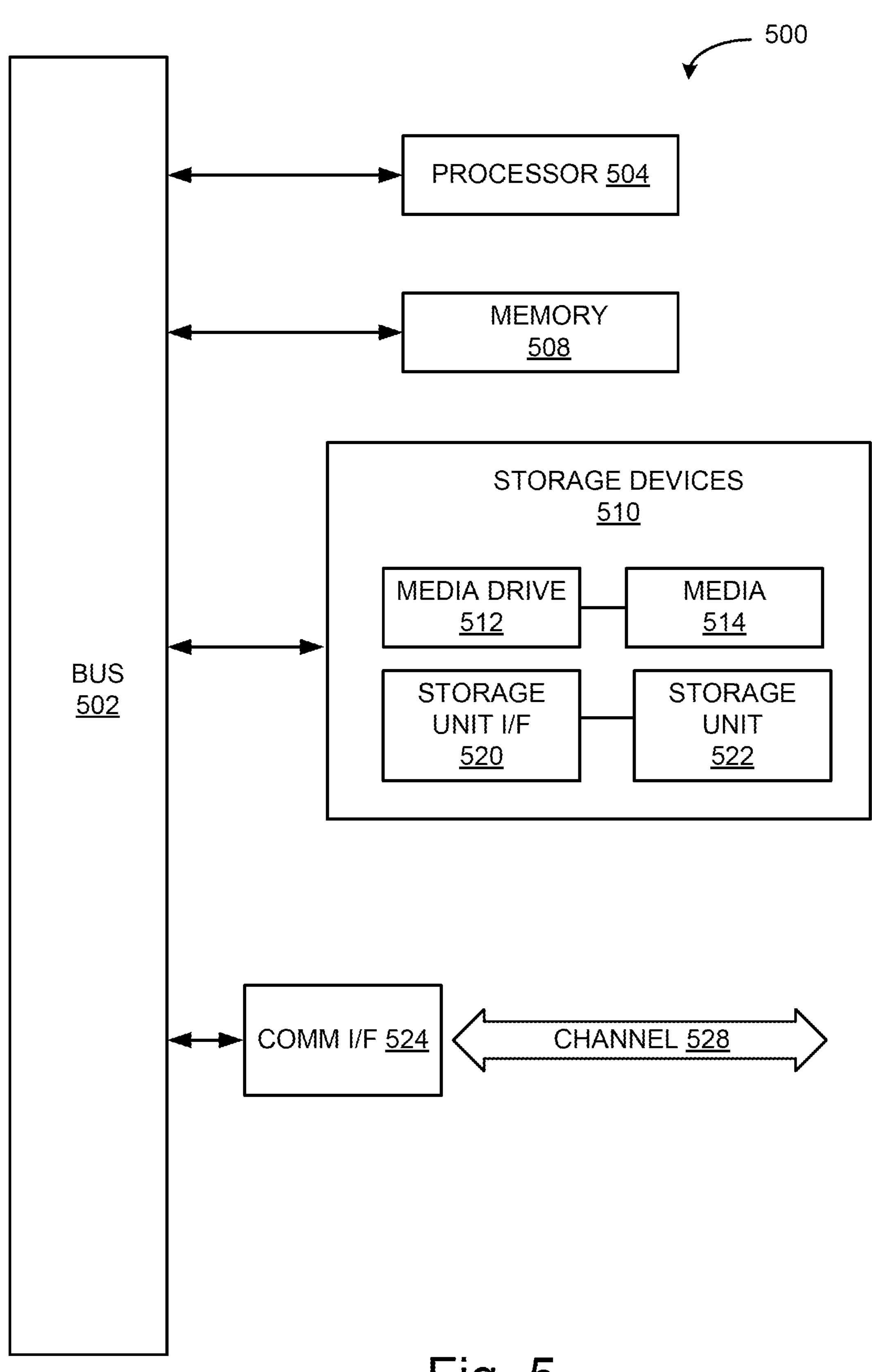
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle control system for a vehicle, comprising:

one or more processors; and a memory coupled to the one or more processors to store instructions, which when executed by the one or more processors, cause the one or more processors to:

receive historical data on a driver of the vehicle's performance;

receive population data indicating a population driving style;

record speed data as the driver of the vehicle drives the vehicle during a trial period, the trial period comprising at least a portion of the driver's first trip in a group of trips;

input the historical data, population data, and speed data into a machine learning model to determine a style for the driver;

receive one or more parameters from the machine learning model indicating the style; and apply the one or more parameters to the vehicle's automated driving system.

2. The vehicle control system of claim 1, wherein the one or more parameters comprise following distance, lane change factors, velocity, and level of aggression.

3. The vehicle control system of claim 1, wherein the historical data comprises survey results obtained from driver input.

4. The vehicle control system of claim 1, wherein the machine learning model comprises a neural network.

5. The vehicle control system of claim 1, wherein the trial period comprises the driver's first fifteen minutes of driving.

6. The vehicle control system of claim 1, wherein applying the one or more parameters comprises updating the vehicle's adaptive cruise controller.

7. The vehicle control system of claim 1, wherein the machine learning model comprises a following distance predictor, a lane change predictor, a velocity predictor, and a style predictor.

8. The vehicle control system of claim 7, wherein the style predictor provides a prediction of the driver's subjective aggressiveness.

9. A method comprising:

receiving survey data from a driver indicating the driver's aggressiveness;

receiving population data indicating a population driving style;

recording speed data as the driver of the vehicle drives the vehicle during a trial period, the trial period comprising at least a portion of the driver's first trip in a group of trips;

inputting the survey data, population data, and speed data into a neural network to determine a style for the driver;

receiving one or more parameters from the neural network indicating the style; and applying the one or more parameters to a vehicle of the driver's automated driving system.

10. The method of claim 9, wherein the one or more parameters comprise following distance, lane change factors, velocity, and level of aggression.

11. The method of claim 9, wherein the trial period comprises the driver's first fifteen minutes of driving.

12. The method of claim 9, wherein applying the one or more parameters comprises updating the vehicle's adaptive cruise controller.

13. The method of claim 9, wherein the neural network comprises a following distance predictor, a lane change predictor, a velocity predictor, and a style predictor.

14. The method of claim 13, wherein the style predictor provides a prediction of the driver's subjective aggressiveness.

15. The method of claim 14, wherein the prediction of the driver's subjective aggressiveness is based on the survey data.

16. A non-transitory machine-readable medium having instructions stored therein, which when executed by one or more processors, cause the one or more processors to:

receive historical data on a driver of a vehicle's performance;

receive population data indicating a population driving style;

record speed data as the driver of the vehicle drives the vehicle during a trial period, the trial period comprising at least a portion of the driver's first trip in a group of trips;

input the historical data, population data, and speed data into a machine learning model to determine a style for the driver;

receive one or more parameters from the machine learning model indicating the style; and update the vehicle's adaptive cruise controller based on the one or more parameters.

17. The non-transitory machine-readable medium of claim 16, wherein the one or more parameters comprise following distance, lane change factors, velocity, and level of aggression.

18. The non-transitory machine-readable medium of claim 16, wherein the historical data comprises survey results obtained from driver input.

19. The non-transitory machine-readable medium of claim 16, wherein the machine learning model comprises a following distance predictor, a lane change predictor, a velocity predictor, and a style predictor.

20. The non-transitory machine-readable medium of claim 19, wherein the style predictor provides a prediction of the driver's subjective aggressiveness.

* * * * *